United States Patent [19]

Shetty

[11] 3,719,669
[45] March 6, 1973

[54] AMINO (OR AMIDO)-PHENYL-ALKYL-BENZAZEPINE ANALGESICS AND NARCOTIC ANTAGONISTS

[75] Inventor: Bola Vithal Shetty, Bombay, India

[73] Assignee: Pennwalt Corportation, Philadelphia, Pa.

[22] Filed: March 27, 1972

[21] Appl. No.: 238,637

Related U.S. Application Data

[63] Continuation-in-part of Ser. No. 711,897, March 11, 1968, abandoned.

[52] U.S. Cl....260/239 BB, 260/239.3 B, 260/240 R, 260/240 D, 260/346.3, 260/465 F, 260/471 A, 260/519, 260/521 R, 260/544 M, 260/570.5 R, 260/612 D, 260/613 D, 424/244

[51] Int. Cl. ............................................C07d 41/08
[58] Field of Search ...............................260/239 BB

[56] References Cited

UNITED STATES PATENTS

| | | | |
|---|---|---|---|
| 3,393,192 | 7/1968 | Walter et al. | 260/239 BB |
| 2,520,264 | 8/1950 | Walter | 260/239 BB |
| 2,684,962 | 7/1954 | Walter | 260/239 |
| 3,483,185 | 12/1969 | Tokolics et al. | 260/239 |

Primary Examiner—Alton D. Rollins
Attorney—Charles E. Feeny

[57] ABSTRACT

Compounds of the general formula:

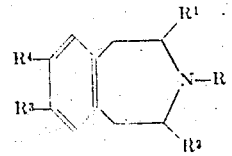

or acid addition salts thereof wherein R is aminophenyl-lower alkyl, lower alkanoylamidophenyl-lower alkyl, methylaminophenyl-lower alkyl, ethylaminophenyl-lower alkyl, or dimethylaminophenyl-lower alkyl in which said amino moiety is either ortho, meta, or para to said lower alkyl moiety; $R^1$ and $R^2$ are independently H or lower alkyl; $R^3$ and $R^4$ are independently H or OH or lower alkoxy. The compounds are useful as analgesics and narcotic antagonists.

21 Claims, No Drawings

AMINO (OR AMIDO)-PHENYL-ALKYL-BENZAZEPINE ANALGESICS AND NARCOTIC ANTAGONISTS

This application is a continuation-in-part of Ser. No. 711,897 filed Mar. 11, 1968, and now abandoned.

This invention relates to benzazepines that are useful as agents for producing analgesia as well as serving as antagonists for narcotics such as morphine.

The compounds have the general formula:

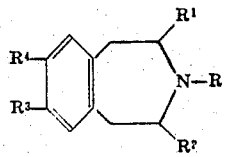

or acid addition salts thereof wherein R is aminophenyl-lower alkyl, lower alkanoylamidophenyl-lower alkyl (e.g. p-propionamido-2-phenyl-1-methyl-ethyl, p-butyramidophenethyl, and the like), methyl-aminophenyl-lower alkyl, ethylamino-phenyl-lower alkyl, or dimethylaminophenyl-lower alkyl in each of which said amino or amido group is either ortho, meta, or para to said lower alkyl group; $R^1$ and $R^2$ are independently H or lower alkyl; $R^3$ and $R^4$ are independently H or OH or lower alkoxy.

Being organic bases the above compounds readily form salts with organic or inorganic acids such as hydrochloric, maleic, tartaric, sulfuric, and other non-toxic acids to form pharmaceutically acceptable acid addition salts.

Particularly satisfactory compounds from the point of view of analgesia and narcotic antagonism are compounds in which $R^4$ and $R^3$ are hydroxy or lower alkoxy.

The following examples of specific compounds and their preparation are given to illustrate the invention, it being understood that other compounds of the general formula may be made by routine modifications within the skill of the art.

Preparation of 7-methoxy-1,2,4,5-tetrahydro-3H,3-benzazepine

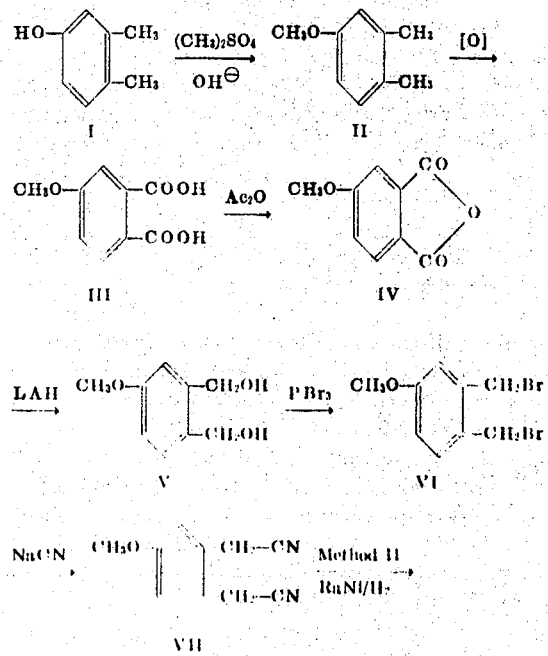

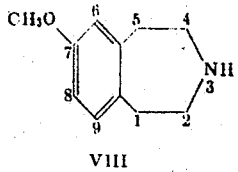

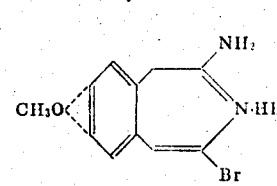

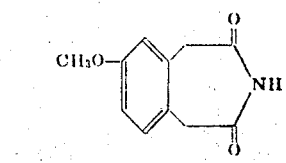

3,4-Dimethyl anisole 3,4-Dimethylphenol (1 kg., 8.2 m) was suspended in water (3,300 ml.) and the stirred mixture was warmed to 45° C. The heat source was removed. With constant stirring, dimethyl sulfate (1,310 gm., 10.4 m) and a solution of sodium hydroxide (576 gm., 14.4) in water (1,480 ml.) were added in alternate portions so that the heat of reaction maintained the temperature at 47° – 50° C. The addition took about 5 hours. The resulting mixture was stirred at room temperature for a further 3 hours and then it was allowed to stand overnight at room temperature.

The reaction mixture was extracted with chloroform (1 × 800 ml., 3 × 400 ml.). The combined chloroform layers were washed with water (3 × 200 ml.). After drying the chloroform solution over anhydrous magnesium sulfate, the solvent was evaporated on a rotatory evaporator at 15 mm. The light yellow oil which remained was distilled at 7 mm pressure and the fraction boiling at 85° – 88° was collected. wt. = 942 gm.

4-Methoxyphthalic acid 3,4-Dimethylanisole (250 gm., 1.84 m) was suspended in water (7 l.) at 70° C. Potassium permanganate (2 kg., 12.6 m) was added portionwise at a rate which maintained the temperature between 75° – 85° C. The addition was complete in 5 hours. The reaction was stirred a further 3 hours, without heating and then it was allowed to stand overnight at room temperature. The precipitated manganese dioxide was removed by suction filtration. Sodium chloride (1,500 gm.) was added to the filtrate which was then acidified with conc. hydrochloric acid to pH 1–2 (approx. 800 ml.). The precipitated solid was extracted into ethyl acetate (3 × 1 l.). The ethylacetate extract was dried over anhydrous magnesium sulfate and then the solvent was evaporated at 15 mm. The residual solid had m.p. 168° – 174°. wt.=240 gm.

4-Methoxyphthalic anhydride

4-Methoxyphthalic acid (959 gm., 5.06 m) and acetic anhydride (2 l.) were mixed together and warmed to reflux. After 2 hours at reflux the solution was filtered while hot. The filtrate was cooled to room temperature and then it was cooled at −70° C overnight. The solid precipitate was recovered by suction filtration, washed with petroleum ether (40° − 60°) and air dried. wt. = 649 gm., m.p. 89°−94°C.

The acetic anhydride mother liquors were evaporated to dryness at 15 mm. The residue was dissolved in ethyl acetate (1 l.) and the solution was washed with water (2 × 500 ml.) saturated sodium carbonate solution (2 × 500 ml.), water (500 ml.) and saturated saline solution (500 ml.). The ethyl acetate was dried over anhydrous magnesium sulfate and evaporated at 15 mm. The solid obtained had m.p. 89° −93°. wt. = 103 gm.

4-Methoxy-o-xylenol

Lithium aluminum hydride (75 gm., 1.98 m) was suspended in tetrahydrofuran (2 l.) in an atmosphere of nitrogen at room temperature. To the stirred suspension was added dropwise a solution of 4-methoxyphthalic anhydride (250 gm., 1.40 m) in tetrahydrofuran (500 ml.) during 3 hours. The resulting reaction mixture was warmed to reflux for 2 hours and then it was allowed to stand at room temperature overnight. Water (75 ml.), 15% sodium hydroxide solution (75 ml.) and water (225 ml.) were added successively to the stirred, ice-cooled reaction mixture. Stirring was continued for a further hour, then the salts were filtered off. The filtrate was dried over magnesium sulfate. The dried solvent was evaporated at 15 mm. A colorless oil was obtained which solidified on standing to give the diol. m.p. 69° − 73° C. wt. = 217 gm. b.p. 146° C/.025 mm.

Anal. Calc. for $C_9H_{12}O_3$: C, 64.27; H, 7.19. Found C, 64.01; H, 7.43.

4-Methoxy-α,α'-dibromo-o-xylene

4-Methoxy-o-xylenol (250 gm., 1.49 m) was suspended in dichloromethane (2.5 l.) at room temperature. Phosphorous tribromide (417 gm., 1.49 m) was added dropwise during 5 ½ hours. The temperature never exceeded 35° C. The first 100 ml. of bromide was added in 5 hours, and the remainder in 30 minutes. The reaction was stirred for a further 2 hours then it was cooled to 10° and water (500 ml.) was added in 10 minutes. The temperature remained below 25°. After a further 5 minutes the dichloromethane was separated and washed with saturated sodium carbonate solution (500 ml.), water (2 × 400 ml.) and saturated brine solution (400 ml.). The dichloromethane solution was dried over magnesium sulfate. Evaporation of the solvent at 15 mm pressure afforded a solid m.p. 48° − 50°. wt. = 430 gm.

The product was recrystallized from petroleum ether (40° − 60°). m.p. 49° − 49.5°.

Anal. Calc. for $C_9H_{10}Br_2O$: C, 37.04; H, 3.43; Br, 54.36. Found: C, 37.15; H, 3.60; Br, 54.42.

4-Methoxy-o-phenylenediacetonitrile

Finely ground sodium cyanide (73 gm., 1.48 m) was suspended in dimethylsulfoxide (500 ml.) by means of a "Vibro-Mixer." A solution of 4-Methoxy-α,α'-dibromo-o-xylene (113 gm., 0.384 m) in dimethylsulfoxide (200 ml.) was added dropwise to the cyanide suspension. The internal temperature was kept at 35° − 38° C by means of an ice bath. The addition took 15 minutes. Agitation of the reaction was continued for a further 1 ½ hours. The reaction mixture was poured into water (4 l.). The aqueous mixture was extracted with ether (2 × 1 l., 3 × 500 ml.) and the combined ether extracts were washed with dilute hydrochloric acid (6N) (2 × 500 ml.), saturated sodium carbonate solution (1 × 500 ml.), water (3 × 500 ml.) and saturated sodium chloride solution (2 × 500 ml.). The ether layer was dried over magnesium sulfate. The dried ethereal solution was evaporated to an oil which was distilled and the fraction with boiling range 160° − 165° (.1 mm) was collected. wt. = 53 gm. The oil obtained was crystallized from ether (650 ml.) to give 45 gm. (m.p. 51° − 53°). A second crop of 5.8 gm. (m.p. 49° − 51°) was obtained.

Anal. Calc. for $C_{11}H_{10}N_2O$: C, 70.78; H, 5.48; N, 14.90. Found: C, 70.95; H, 5.41; N, 15.05.

4-Methoxy-o-phenylenediacetimide

4-Methoxy-o-phenylenediacetonitrile (135 gm., 0.725 m) was dissolved in acetic acid (180 ml.) and added dropwise during 30 minutes to a solution of hydrobromic acid in acetic acid (32 percent, 500 gm.) at 15° − 20°C. The reaction was stirred at room temperature for 4 hours. The precipitated solid was filtered and washed with acetic acid until the solid was colorless. The solid was washed with acetone and air dried. wt. = 196 gm.

The above solid was added to water (3.5 l.) which had been preheated to 85°. When the solid had been dissolved anhydrous sodium acetate (48 gm., 0.59 m) was added during five minutes. The temperature rose to 93° and it was maintained at 92° − 93° for 1 hour. The heat source was removed and the reaction was stirred for 45 minutes while the temperature dropped to 70°. The warm reaction was filtered to give the required imide. m.p. 180° − 183°, wt. = 105 gm. The imide was recrystallized from absolute methanol m.p. = 181° − 183°.

Anal. Calc. for $C_{11}H_{11}NO_3$: C, 64.38; H, 5.40; N, 6.83. Found: C, 64.57; H, 5.59; N, 6.62.

7-Methoxy-1,2,4,5-tetrahydro-3H,3-benzazepine

Method I

4-Methoxy-o-phenylenediacetimide (50 gm., 0.245 m) was added portion-wise during 20 minutes to a solution of borane in tetrahydrofuran (1 l., 1 m in $BH_3$) which was being stirred at 10° C in an atmosphere of nitrogen. The solution was stirred at room temperature for 5 hours. Hydrochloric acid (6N, 20 ml.) was added to the stirred, ice-cooled reaction during 45 minutes. The initial foaming subsided and a further 230 ml. of hydrochloric acid (6N) were added during 30 minutes. The suspension was stirred at room temperature for 16 hours and then the insolubles were filtered. The filtrate was evaporated to dryness at 15mm. and the residual solid was treated with water (500 ml.). The aqueous mixture was filtered and the filtrate was basified with 10 percent sodium hydroxide solution. The precipitated oil was extracted into benzene (1 l.) and the benzene extract was dried over magnesium sulfate. Evaporation of the benzene afforded an oil (32 gm.) which was distilled at 0.05 mm. The fraction with the boiling range 90° – 93° was collected wt. = 28.0 gm.

The amine was analyzed as the maleate salt which was recrystallized from methyl ethyl ketone. m.p. 140° – 141°.

Anal. Calc. for $C_{11}H_{15}NO \cdot C_4H_4O_4$ : c, 61.42; H, 6.53; N, 4.78. Found: C, 61.52; H, 6.74; N, 4.93.

Method II

A Parr hydrogenation bomb (1 l.) was charged with 4-methoxy-o-phenylenediacetonitrile (75 gm., 0.403 m), absolute ethanol (500 ml.) and Raney-Nickel catalyst (Raney No. 28 in water, 50 gm. of wet catalyst). The catalyst was washed several times with absolute ethanol before it was added. The bomb was heated until the solution temperature was 90°C and the hydrogen pressure was 1000 psi. Stirring was begun and heating was stopped. The reduction was carried out at 1000 – 700 psi and the stirring was continued until the temperature had dropped to 30° C. The hydrogen pressure reduction was 1760 psi. The catalyst was removed by filtration and the solvent was evaporated. The residual oil was distilled and the fraction with the boiling range 82° – 86° (0.01 mm) was collected. wt. = 24 gm.

7-Hydroxy-1,2,4,5-tetrahydro-3H,3-benzazepine

7-Methoxy-1,2,4,5-tetrahydro-3H,3-benzazepine (15 gm., 0.085m) was refluxed with 48 percent aqueous hydrobromic acid (120 ml.) for 3 hours. The excess acid was evaporated in vacuo and the residual solid was washed with acetone and filtered to give the salt of the title compound. wt. = 19.5 gm. The salt was recrystallized from absolute ethanol. m.p. 248° – 249°.

Anal. Calc. for $C_{10}H_{13}NO \cdot HBr$: C, 49.19; H, 5.78; Br, 32.73; N, 5.74. Found: C, 49.15; H, 6.00; Br, 32.44; N, 5.61.

The free amine was obtained by treating the above salt in aqueous solution with an equivalent amount of sodium hydroxide. The solid precipitate was filtered and recrystallized from isopropanol. m.p. 191° – 193°.

Anal. Calc. for $C_{10}H_{13}NO$: C, 73.59; H, 8.03; N, 8.58. Found: C, 73.34; H, 8.03; N, 8.71.

ROUTES TO 3-SUBSTITUTED BENZAZEPINES

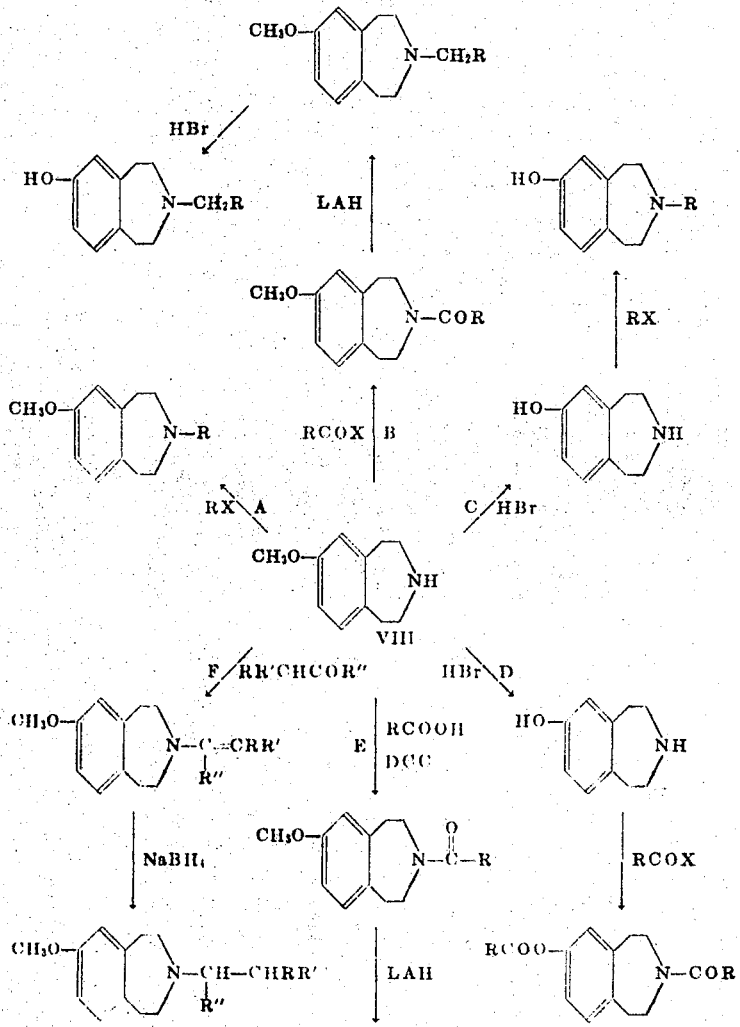

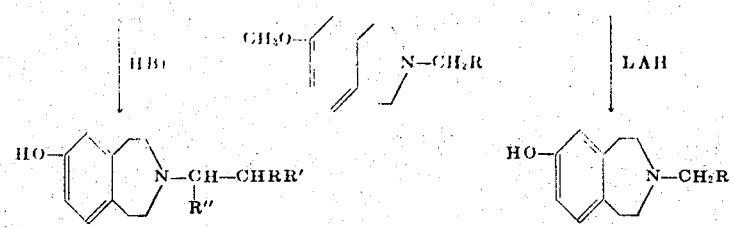

EXAMPLE 1.

3-(p-Aminophenethyl)-7-methoxy-1,2,4,5-tetrahydro-3H,3-benzazepine (Method E)

A solution of p-nitrophenylacetic acid (11.7 gm., 0.064 m) in tetrahydrofuran (50 ml.) was added to a solution of 7-methoxy-1,2,4,5-tetrahydro-3H,3-benzazepine (10.3 gm., 0.058 m) in tetrahydrofuran (50 ml.) at room temperature. A solution of dicyclohexylcarbodiimide (14.5 gm., 0.0705 m) in tetrahydrofuran (50 ml.) was added immediately to the reaction and stirring was continued for 4 hours. Acetic acid (10 ml.) was added to the reaction and then the solids were removed by filtration. The solvent was evaporated in vacuo and the residue was treated with diethyl ether (150 ml.) and benzene (150 ml.). The insoluble solids were removed by filtration and washed with benzene (200 ml.). The solids were dissolved in tetrahydrofuran (250 ml.) and filtered from a small quantity of dicyclohexyl urea. The benzene:ether extract was washed with potassium carbonate solution, and hydrochloric acid (3N). The tetrahydrofuran extract was washed with potassium carbonate solution. The extracts were combined and evaporated in vacuo to give the crude amide. wt. = 25 gm. The crude amide was dissolved in methanol (200 ml.) and hydrogenated at 60 psi over platinum oxide (1 gm.). Hydrogen absorption ceased after 20 minutes with a drop in pressure of 17 p.s.i. The catalyst was removed by filtration and the solvent was evaporated in vacuo. The residue was dissolved in hydrochloric acid (0.3N, 1500 ml.) and filtered from some insolubles. The acid solution was washed with ether and then it was basified with sodium hydroxide solution. The precipitated product was extracted into chloroform. The chloroform extract was dried over magnesium sulfate and evaporated in vacuo to give the crude amino-amide. wt. = 22.5 gm. The amino-amide was dissolved in tetrahydrofuran (150 ml.) and added dropwise to a suspension of lithium aluminum hydride (5 gm., 0.0132 m) in diethyl ether (175 ml.) at such a rate that gentle reflux was maintained. The reaction was refluxed for 21 hours. The complex was decomposed by the successive addition of water (5 ml.), 15 percent sodium hydroxide solution (5 ml.) and water (15 ml.). The solvents were filtered and dried over magnesium sulfate. Evaporation of the solvents in vacuo afforded an oil which was converted to the dihydrochloride salt and recrystallized from methanol to give the dihydrochloride of the title compound. m.p. 264.5 – 265.5. wt. = 11.1 gm.

Anal Calc. for $C_{19}H_{24}N_2O \cdot 2HCl$: C, 61.79; H, 7.10; N, 7.59; Cl, 19.20. Found: C, 61.63; H, 6.86; N, 7.61; Cl, 19.45. Compound 673-98A.

EXAMPLE 2.

3-(p-Aminophenethyl)-7-hydroxy-1,2,4,5-tetrahydro-3H,3-benzazepine (Method E)

3-(p-Aminophenethyl)-7-methoxy-1,2,4,5-tetrahydro-3H,3-benzazepine dihydrochloride (11.3 gm., 0.0306 m) was suspended in 48 percent aqueous hydrobromic acid (175 ml.) and refluxed for 2 hours. The excess acid and water were removed in vacuo. The residual solid was dissolved in water (250 ml.) and basified with potassium carbonate solution. The precipitated solid was filtered and dried. The solid was converted to the hydrochloride salt and recrystallized from methanol: diethyl ether (1:2). m.p. 309.5°- – wt. = 8.7 gm.

Anal. Calc. for $C_{18}H_{22}N_2O \cdot 2HCl$: C, 60.84; H, 6.81; N, 7.89; Cl, 19.95. Found: C, 60.62; H, 7.03; N, 8.06; Cl, 19.85. Compound 725-061.

EXAMPLE 3.

3-(2-p-Aminophenyl-1-methylethyl)-7-methoxy-1,2,4,5-tetrahydro-3H,3-benzazepine

7-Methoxy-1,2,4,5-tetrahydro-3H,3-benzazepine (10 gm., 0.0565 m), 1-(p-nitrophenyl)-2-propanone (11 gm., 0.0622 m) and p-toluenesulfonic acid (0.2 gm.) were dissolved in toluene (100 ml.) and refluxed for 20 hours. A Dean and Stark apparatus was attached and the eliminated water was collected. The toluene solution was diluted with methanol (200 ml.) and cooled to 10°. Sodium borohydride (8.5 gm., 0.226 m) was added portionwise to the stirred reaction during 20 minutes. The reaction was stirred at room temperature for 4 hours. Water (100 ml.) and diethyl ether (100 ml.) were added cautiously. The organic layer was separated and washed with dilute hydrochloric acid. A gummy precipitate formed which was separated and then basified with sodium hydroxide solution. The aqueous acid solution was also basified. The alkali insolubles were combined and extracted into diethyl ether. The ether solution was dried over magnesium sulfate. Evaporation of the solvent afforded a dark red oil. wt. = 10.6gm. The oil was purified by chromatography on silica gel. Elution of the column with benzene:diethyl ether (1:1) afforded 7-methoxy-3-[1-methyl-2-p-nitrophenylethyl]-1,2,4,5-tetrahydro-3H,3-benzazepine as an oil. The amine was converted to the hydrochloride salt and recrystallized from methanol. m.p. =223° – 230°. wt. =3.9 gm.

Anal. Calc. for $C_{20}H_{24}N_2O_3 \cdot HCl$ C, 63.74; H, 6.69; N, 7.43; Cl, 9.41. Found: C, 63.77; H, 6.69; N, 7.48; Cl, 9.72.

The amine hydrochloride (2.4 gm., 0.0064 m) was dissolved on methanol (75 ml.) containing conc. hydrochloric acid (1ml.) and the solution was charged with 5% palladium-charcoal catalyst. The nitro group was hydrogenated at 50 p.s.i. during 15 minutes. The solution was filtered from the catalyst and evaporated to give the crude title compound as the dihydrochloride salt. The salt was purified by crystallization from methanol:diethyl ether (2:1). m.p. = 245° – 255°.

Anal. Cald. for $C_{20}H_{26}N_2O \cdot 2HCl$: C, 62.65; H, 7.36; N, 7.31; Cl, 18.50. Found: C, 62.47; H, 7.51; N, 7.33; Cl, 18.13. Compound 751-226.

EXAMPLE 4.

3-(p-Acetamidophenethyl)-7-methoxy-1,2,4,5-tetrahydro-3H,3-benzazepine

Triethylamine (11.0 gm., 0.108 m) was added to a suspension of 3-(p-aminophenethyl)-7-methoxy-1,2,4,5-tetrahydro-3H,3-benzazepine dihydrochloride (13 gm., 0.035 m) in chloroform (200 ml.). The mixture was stirred and cooled with an ice-water bath. Acetyl chloride (3.3 gm., 0.042 m) was added dropwise during 5 minutes and the reaction was stirred at room temperature for 1 hour. The insoluble material was filtered to give the title compound as the hydrochloride salt. m.p. = 289 - 290°. wt. = 8.0 gm.

Anal. Calc. for $C_{21}H_{28}N_2O_2 \cdot HCl$: C, 67.28; H, 7.26; N, 7.47; Cl 9.46. Found: C, 67.10; H, 7.56; N, 7.53; Cl 9.34. Compound 753-850A.

The crude sulfonamide (43 gm., 0.135 M) was dissolved in acetone (1100 ml.). Anhydrous potassium carbonate powder (135 gm.) was added and the reaction was stirred and refluxed. Ethylbromoacetate (33.7 gm., 0.202 M) was added in four equal portions at 30 minute intervals. After stirring and refluxing for 20 hours the salts were filtered from the cooled solution. Evaporation of the acetone gave an oily residue which consisted mainly of the alkylated amine. The ester function was hydrolysed by refluxing the oil with ethanol (95 percent, 900 ml.) and sodium hydroxide (10 percent aqueous, 270 ml.) for 6 hours. The ethanol was removed on the rotatory evaporator and the aqueous residue was diluted with water (1 l.) until a clear solution was obtained. The solution was washed with diethyl ether and then it was made acid with concentrated hydrochloric acid. The oily precipitate was extracted into ether and then the ether solution was washed with sodium bicarbonate solution. The bicarbonate solution was separated and acidified with concentrated hydrochloric acid and the precipitated acid was isolated in diethyl ether. The ether solution was dried over magnesium sulfate. Evaporation of the solvent afforded N-[2-(3-methoxyphenyl)-1-methyl]ethyl-N-toluene-p-sulfonyl glycine as a viscous oil which resisted crystallization. Wt = 40.5 gm.

GENERAL METHOD—ALKYL SUBSTITUTION ON THE AZEPINE RING

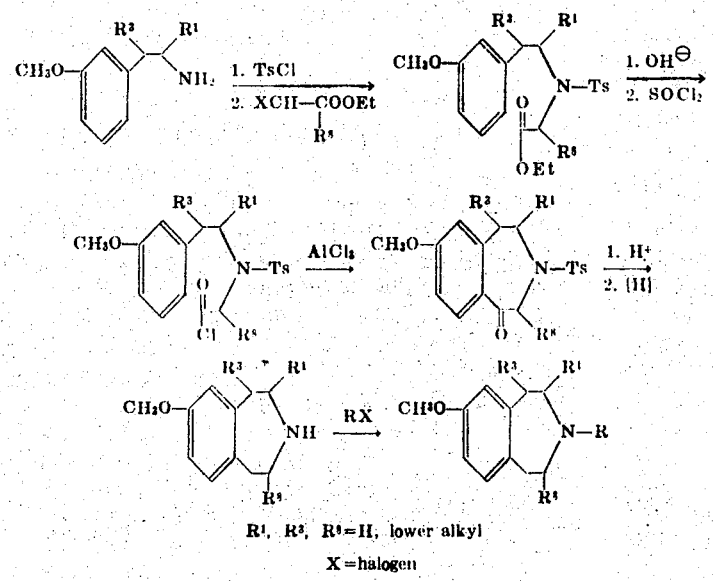

$R^1$, $R^2$, $R^3$ = H, lower alkyl

X = halogen

EXAMPLE 5.

3-(p-Aminophenethyl)-8-methoxy-2-methyl-1,2,4,5-tetrahydro-3H,3-benzazepine A solution of p-toluenesulfonyl chloride (28.8 gm., 0.15 M) in benzene (100 ml.) was added dropwise to a solution of 2-(3-methoxyphenyl)-1-methylethylamine (23 gm., 0.139 M) and triethylamine (13 gm., 0.15 M) in benzene (200 ml.) during 30 minutes. The reaction was stirred at room temperature for 4 hours. The precipitated triethylamine hydrochloride was filtered off and the benzene solution was washed with hydrochloric acid (3N), water and saturated brine. The benzene solution was dried over magnesium sulfate. Evaporation of the solvent afforded N-toluene-p-sulfonyl-2-(3-methoxyphenyl)-1-methylethylamine as an oil. Wt = 42 gm.

The crude acid (40 gm., 0.106 M) was refluxed in benzene solution (500 ml.) with thionyl chloride (25.3 gm., 0.212 M) for 9 hours. The excess thionyl chloride and solvent were removed on the rotatory evaporator. The crude acid chloride was dissolved in methylene dichloride (100 ml.) and added dropwise to a suspension of aluminum chloride (17.4 gm., 0.13 M) in methylene dichloride (300 ml.) which had been cooled to −65° C. The addition took 3 hours. The reaction was stirred at −65° for a further 7 hours and then it was stirred while warming to 15°C during 12 hours. The reaction mixture was poured onto ice (1500 gm.)/concentrated hydrochloric acid (75 ml.) and the mixture was stirred for 1.5 hours. The methylene chloride layer was separated and washed with water, sodium bicarbonate solution and saturated brine. Evaporation of the solvent afforded an oil. Wt = 37 gm. The oil was purified by chromatography on silica gel. Elution of the column with acetone:benzene (1:40) afforded the crude title compound which was purified by crystallization from absolute methanol. Wt = 11.4 gm. m.p. 119° – 121.5°.

Anal. Calcd. for $C_{19}H_{21}NO_4S$: C, 63.49; H, 5.89; N, 3.90; S, 8.92

Found: C, 63.77; H, 6.04; N, 3.61; S, 8.93

Further elution of the column afforded the 9-methoxy isomer which was crystallized from absolute methanol. Wt = 1.5 gm. m.p. 127° – 128°.

Anal. Calcd. for $C_{19}H_{21}NO_4S$: C, 63.49; H, 5.89; N, 3.90; S, 8.92

Found: C, 63.41; H, 6.03; N, 3.65; S, 9.16

1-Hydroxy-7-methoxy-4-methyl-3-toluene-p-sulfonyl-1,2,4,5-tetrahydro-3H,3-benzazepine Sodium borohydride (1 gm., 0.0264 M) was added during 5 minutes to a suspension of 7-methoxy-4-methyl-3-toluene-p-sulfonyl-1,2,4,5-tetrahydro-3H,3-benzazepin-1-one (7.5 gm., 0.0208 M) in absolute ethanol (100 ml.) at room temperature. The mixture was warmed to 60° during 30 minutes and then the heat source was removed. After stirring for a further 3 hours at room temperature the reaction mixture was poured onto ice/concentrated hydrochloric acid (500 ml./25 ml.). The precipitate was extracted into chloroform. Evaporation of the chloroform afforded a viscous oil which, on trituration with diethyl ether afforded a solid. Wt = 5.4 gm. m.p. = 83° – 87°. The solid was crystallized from diethyl ether to give the pure title compound. m.p. 84°–87°.

Anal. Calcd. for $C_{19}H_{23}NO_4S$: C, 63.14; H, 6.41; N, 3.88; S, 8.87

Found: C, 63.09; H, 6.40; N, 4.00; S, 9.11

8-Methoxy-2-methyl-3-toluene-p-sulfonyl-1,2-dihydro-3H,3-benzazepine

1-Hydroxy-7-methoxy-4-methyl-3-toluene-p-sulfonyl-1,2,4,5-tetrahydro-3H,3-benzazepine (7 gm., 0.0194 M) and p-toluene sulfonic acid (20 mg.) were dissolved in benzene (80 ml.) and the solution was refluxed for 1.5 hours. The solvent was condensed over a Soxhlet tube containing Linde Type 3A molecular sieves (1/16 inch). The solvent was evaporated and the residue was purified by chromatography on silica gel. Elution of the column with acetone:benzene (3:100) afforded an oil which solidified on trituration with diisopropyl ether to give the title compound. Wt = 5.0 gm. m.p. = 77° – 79°

Anal. Calcd. for $C_{19}H_{21}NO_3S$: C, 66.43; H, 6.16; N, 4.08; S, 9.34

Found: C, 66.26; H, 6.28; N, 3.93; S, 9.23

Further elution of the column afforded a solid which was crystallized from absolute methanol. Wt = 0.38 gm. m.p. = 177° – 182°

Found: C, 66.20; H, 6.38; N, 3.95; S, 9.52

8-Methoxy-2-methyl-3-toluene-p-sulfonyl-1,2,4,5-tetrahydro-3H,3-benzazepine

A solution of 8-methoxy-2-methyl-3-toluene-p-sulfonyl-1,2,-dihydro-3H,3-benzazepine (4.7 gm., 0.0137 M) in acetic acid (50 ml.) was hydrogenated over 5 percent palladium-charcoal (0.4 gm.) in a Parr apparatus at an initial pressure of 37 p.s.i. The adsorption of hydrogen was complete in 2.5 hours. The catalyst was filtered off and the filtrate was evaporated to dryness. The residue was triturated with diisopropyl ethyl to give the title compound as a solid. Wt = 4.3 gm. The solid was crystallized from absolute methanol. m.p. = 86° – 89°

Anal. Calcd. for $C_{19}H_{23}NO_3S$: C, 66.07; H, 6.71; N, 4.06; S, 9.28

Found: C, 66.10; H, 6.88; N, 3.97; S, 9.29

8-Methoxy-2-methyl-1,2,4,5-tetrahydro-3H,3-benzazepine

8-Methoxy-2-methyl-3-toluene-p-sulfonyl-1,2,4,5-tetrahydro-3H,3-benzazepine (1 gm., 0.003 M) was suspended in liquid ammonia (35 ml.). Sodium (0.15 gm.) was added portionwise until the blue color persisted. After a further 15 minutes ammonium chloride (2 gm.) was added and the ammonia was allowed to evaporate. Water was added and the insolubles were extracted into diethyl ether. Evaporation of the ether afforded an oil. Wt = 0.62 gm. The title compound was isolated as the hydrochloride salt and the salt was crystallized from iso-propanol. Wt = 0.28 mg. m.p. = 196° – 200°.

Anal. Calcd. for $C_{12}H_{17}NO \cdot HCl$: C, 63.29; H, 7.97; Cl, 15.57; N, 6.15

Found: C, 63.34; H, 8.22; Cl, 15.33; N, 6.20

By following the procedure of example 1, 8-methoxy-2-methyl-1,2,4,5-tetrahydro-3H,3-benzazepine is converted to the corresponding amide by p-nitrophenyl-acetic acid and dicyclohexylcarbodiimide in tetrahydrofuran solution. Reduction of the amide in methanol solution over platinum oxide affords the corresponding amine, 3-(p-aminophenylacetyl)-8-methoxy-2-methyl-1,2,4,5-tetrahydro-3H,3-benzazepine. The amino-amide is reduced by lithium aluminum hydride in tetra-hydrofuran at reflux to give the compound, 3-(p-aminophenethyl)-8-methoxy-2-methyl-1,2,4,5-tetrahydro-3H,3-benzazepine. Compound 778-033.

EXAMPLE 6.

3-(p-Aminophenethyl)-8-hydroxy-2-methyl-1,2,4,5-tetrahydro-3H,3-benzazepine By following the procedure of example 2, 3-(p-aminophenethyl)-8-methoxy-2-methyl-1,2,4,5-tetrahydro-3H,3-benzazepine is demethylated by refluxing with 48 percent aqueous hydrobromic acid. The title compound is obtained from the hydro-bromide salt by neutralizing with potassium carbonate solution.

EXAMPLE 7.

3-(p-Aminophenethyl)-7-methoxy-1,2,4,5-tetrahydro-3H,3-benzazepine methiodide Iodomethane (1.5 gm., 0.0114 M) was added to a solution of 3-(p-aminophenethyl)-7-methoxy-1,2,4,5-tetrahydro-3H,3-benzazepine (3 gm., 0.0103 M) in acetone (40 ml.). The acetone was decanted from the gummy precipitate and the gum was triturated with ethyl alcohol (95 percent) to give the solid methiodide. The salt was recrystallized from water. Wt = 0.8 gm. m.p. = 236° – 239°.

Anal. Calcd. for $C_{20}H_{27}IN_2O$: C, 54.79; H, 6.21; I, 28.95; N, 6.39

Found: C, 54.64; H, 6.29; I, 29.13; N, 6.39.

ADDITIONAL EXAMPLES

| R⁴ | R | Compound |
|---|---|---|
| CH₃O | 3-aminophenyl-CH₂CH₂– (m-NH₂) | 3-(m-aminophenethyl)-7-methoxy-1,2,4,5-tetrahydro-3H,3-benzazepine. |
| HO | 3-aminophenyl-CH₂CH₂– (m-NH₂) | 3-(m-aminophenethyl)-7-hydroxy-1,2,4,5-tetrahydro-3H,3-benzazepine. |
| CH₃O | 2-aminophenyl-CH₂CH₂– (o-NH₂) | 3-(O-aminophenethyl)-7-methoxy-1,2,4,5-tetrahydro-3H,3-benzazepine. |
| HO | 2-aminophenyl-CH₂CH₂– (o-NH₂) | 3-(O-aminophenethyl)-7-hydroxy-1,2,4,5-tetrahydro-3H,3-benzazepine. |
| HO | CH₃CONH-C₆H₄-CH₂CH₂– | 3-(p-acetamidophenethyl)-7-hydroxy-1,2,4,5-tetrahydro-3H,3-benzazepine. |
| CH₃O | CH₃NH-C₆H₄-CH₂CH₂– | 7-methoxy-3-(p-methylaminophenethyl)-1,2,4,5-tetrahydro-3H,3-benzazepine. |
| HO | CH₃NH-C₆H₄-CH₂CH₂– | 7-hydroxy-3-(p-methylaminophenethyl)-1,2,4,5-tetrahydro-3H,3-benzazepine. |
| CH₃O | (CH₃)₂N-C₆H₄-CH₂CH₂– | 3-(p-dimethylaminophenethyl)-7-methoxy-1,2,4,5-tetrahydro-3H,3-benzazepine. |
| HO | (CH₃)₂N-C₆H₄-CH₂CH₂– | 3-(p-dimethylaminophenethyl)-7-hydroxy-1,2,4,5-tetrahydro-3H,3-benzazepine. |
| H | H₂N-C₆H₄-CH₂CH₂– | 3-(p-aminophenethyl)-1,2,4,5-tetrahydro-3H,3-benzazepine. |
| HO | H₂N-C₆H₄-CH(CH₃)CH₂– | 3-(2-p-aminophenyl-1-methylethyl)-7-hydroxy-1,2,4,5-tetrahydro-3H,3-benzazepine. |

| R⁴ | R | Compound |
|---|---|---|
| CH₃O | H₂N-C₆H₄-CH₂CH₂– | 3-(p-aminophenethyl)-8-methoxy-2-methyl-1,2,4,5-tetrahydro-3H,3-benzazepine. |
| CH₃O | H₂N-C₆H₄-CH₂CH₂– | (+)-3-(p-aminophenethyl)-8-methoxy-2-methyl-1,2,4,5-tetrahydro-3H,3-benzazepine. |
| CH₃O | H₂N-C₆H₄-CH₂CH₂– | (−)-3-(p-aminophenethyl)-8-methoxy-2-methyl-1,2,4,5-tetrahydro-3H,3-benzazepine. |
| HO | H₂N-C₆H₄-CH₂CH₂– | 3-(p-aminophenethyl)-8-hydroxy-2-methyl-1,2,4,5-tetrahydro-3H,3-benzazepine. |
| HO | H₂N-C₆H₄-CH₂CH₂– | (+)-3-(p-aminophenethyl)-8-hydroxy-2-methyl-1,2,4,5-tetrahydro-3H,3-benzazepine. |
| HO | H₂N-C₆H₄-CH₂CH₂– | (−)-3-(p-aminophenethyl)-8-hydroxy-2-methyl-1,2,4,5-tetrahydro-3H,3-benzazepine. |

PHARMACOLOGICAL ACTIVITY OF BENZAZEPINE COMPOUNDS

Compounds of the present invention have been evaluated in experimental animals for analgesic activity and ability to antagonize the action of strong narcotic analgesics. It has been possible through use of conventional testing methods in animals to demonstrate various degrees of these activities by one or several methods and routes of administration at does levels which do not result in gross toxic manifestations. In addition, other pharmacological properties of representative compounds of this invention have been detected, such as antihistaminic and anticholinergic activity. Recognized indications of drug addiction typical of the opiates have not been observed following administration to a morphine dependent monkey indicating a lack of addiction liability for these benzazepine compounds. Thus, results of pharmacological evaluations support the contention that the benzazepine compounds of the formulae disclosed in this application are of value as narcotic antagonist analgesics.

Results

Analgesic Activity

Table I provides a summary of the results obtained when representative compounds of this invention were tested for analgesic activity by the methods described. The narcotic antagonist analgesic pentazocine and the narcotic analgesics morphine and codeine are included for comparison. It is evident from this comparison that the majority of compounds which exhibit activity at dose levels below those producing toxic manifestations, i.e., less than the highest non-symptomatic dose (HNSD), are effective primarily by the parenteral route. An exception is compound SR673-98A, which is active by the oral route. The predominance of parenteral efficacy is evident by both the hot plate method where the intraperitoneal route was used and by the writhing method with administration by the subcutaneous route. The most active compounds were SR673-98A and SR753-850A. In addition, these compounds also exhibit the greatest separation between effective dose and toxic or lethal doses indicating a more favorable therapeutic index.

The most active compounds listed in Table I are comparable to codeine by the hot plate method of testing and are 6 to 10 times more active than pentazocine by the intraperitoneal route in this test. Compound SR673-98A which exhibits activity by the oral route in the writhing test is approximately twice as active as pentazocine.

The benzazepine compound given in Table II is an example showing narcotic antagonist activity determined by two methods. Inhibition of oxymorphone mydriasis in the mouse provided qualitative evidence of antagonist activity whereas inhibition of morphine analgesia in the rat permitted semi-quantitative expression of antagonism. Narcotic antagonist activity was demonstrated for the benzazepine compound in Table II by both of the test methods. Compound SR673-98A appears to be a more potent antagonist than pentazocine. No compound possessed activity approaching that of nalorphine, including the standard pentazocine. In addition to therapeutic application of these compounds as analgesics, narcotic antagonists have been of value in treatment of narcotic addiction.

For all benzazepine compounds listed, various degrees of similar toxic manifestations occurred with increasing dosage characterized by depression, ataxia, reduced respiration, exophthalmos, salivation, lacrimation, vasodilation, cyanosis and mydriasis. Also common with all compounds was development of moderate to severe clonic convulsions and death of the animals was attributable to respiratory failure.

Antihistaminic and Anticholinergic Activity

Table III provides a summary of the relative antihistaminic and anti-cholinergic activity of benzazepine compounds as demonstrated through use of isolated segments of guinea pig ileum. It is apparent from these results that positive antihistaminic action can be elicited with the compounds listed in the table, the most potent of which, (SR673-98A) is approximately 25 times less active than the antihistaminic standard diphenhydramine. Weak anticholinergic activity relative to atropine was exhibited by these compounds.

TABLE I

[Analgesic activity of benzazepine compounds]

| Name | HNSD*, mg./kg. PO** | HNSD*, mg./kg. IP*** | LD$_{50}$, mg./kg. PO | LD$_{50}$, mg./kg. IP | Hot plate, ED$_{50}$, mg./kg. PO | Hot plate, ED$_{50}$, mg./kg. IP | Writhing, ED$_{50}$, mg./kg. PO | Writhing, ED$_{50}$, mg./kg. SC**** |
|---|---|---|---|---|---|---|---|---|
| 7-methoxy-3-(p-acetamidophenethyl)-1,2,4,5-tetrahydro-3H,3-benzazepine hydrochloride.[1] | | | | | | | | |
| 3-(para-aminophenylethyl)-7-methoxy-1,2,4,5-tetrahydro-3H,3-benzazepine dihydrochloride.[2] | 32 | 32 | >1,000 | 100 | >32 | 9 | >32 | ~7 |
| 3-(p-aminophenethyl) 7-hydroxy-1,2,4,5-tetrahydro-3H,3-benzazepine dihydrochloride.[3] | 100 | 18 | 445 | 52 | 85 | 17 | 45 | ~6 |
| Pentazocine | 316 | 56 | >1,000 | 121 | >315 | 37 | 120 | |
| Morphine | 316 | 316 | ~800 | >500 | >316 | 100 | 70 | |
| Codeine | 56 | 10 | ~800 | 250 | 14 | 2.5 | 3 | |
| | 100 | 32 | 540 | 104 | 20 | 12 | 17 | |

[1] Compound number, SR753-850A.
[2] Compound number, SR673-98A.
[3] Compound number, SR725-61A.
*HNSD = Highest non symptomatic dose.
**PO = Per Os.
***IP = Intraperitoneal.
****SC = Subcutaneous.

TABLE II

Narcotic Antagonist Activity of Benzazepine Compounds

| Name | Antagonism of Oxymorphone Mydriasis PO* | Antagonism of Oxymorphone Mydriasis IP** | Antagonism of Morphine Analgesia S.C.*** |
|---|---|---|---|
| 3-(paraamino phenylethyl)- 7-methoxy 1,2,4,5 tetrahydro- 3H,3-benzazepine dihydro- chloride | − | + | ++ |
| Pentazocine | + | + | + |
| Morphine | − | − | − |
| Codeine | − | − | − |
| Nalorphine | + | + | Approximately 20–100 times more active than compounds listed above. |

* PO = Per OS
** IP = Intraperitoneal
*** S.C. = Subcutaneous

TABLE III

Antihistamine and Anticholinergic Activity of Benzazepine Compounds

| Compound | Conc. for 50% block of Acetylcholine µg/20 ml | Conc. for 50% block of Histamine µg/20 ml |
|---|---|---|
| SR 673-98A | 54 | 3 |
| SR 725-61A | 840 | 100 |

| Atropine | 0.0035 | 37 |
| Diphenhydramine | 3.3 | 0.12 |

EXAMPLE 8.

(+) 3-(p-Aminophenethyl)-2-methyl-1,2,4,5-tetrahydro-3H,3-benzazepine (Cpd. 786-737)

N-Toluene-p-sulfonyl-1-methyl-2-phenylethylamine

Dextro amphetamine (200 g) and triethylamine (164 g) were dissolved in 1500ml. of benzene. A solution of p-toluene sulfonyl chloride (310g) in 500ml. of benzene was added dropwise to the cooled solution during one hour. The reaction mixture was stirred for three hours at room temperature, then allowed to stand for approximately 16 hours (over night) at room temperature (approximately 20° C). The salts were filtered off and the benzene solution was washed with dilute HCl, water and brine. Evaporation of the solvent afforded an oil.

d-N-toluene-p-sulfonyl-N-(1-methyl-2-phenyl) ethylglycine

The crude N-toluene-p-sulfonyl-1-methyl-2-phenylethylamine (240g) was dissolved in 4 liters of acetone. Finely ground potassium carbonate (750g) was added and the suspension was brought to reflux. Ethylbromoacetate (208g) was added in six equal portions at 20 minute intervals. The reaction was refluxed approximately 16 hours (over night). The acetone solution was filtered and evaporated to an oil which was dissolved in 95 percent ethanol (4.8 liters) containing 10 percent aqueous NaOH (1 liter). The solution was refluxed for six hours and then permitted to stand at room temperature for three days. The ethanol was evaporated and the oily salt was dissolved in water (8 liters), washed with ether and acidified with concentrated HCl. The oily precipitate was extracted into ether, washed with sodium bicarbonate and the bicarbonate layer was acidified with concentrated HCl. The precipitated acid was isolated by ether extraction. Evaporation of the ether afforded a solid having a melting point of 114°–116° C. The solid was recrystallized from benzene/cyclohexane (250/300ml) to give a melting point of 115–118°.

d-N-Toluene-p-sulfonyl-N-(1-methyl-2-phenyl)-ethylglycine acid chloride d-N-Toluene-p-sulfonyl-N-(1-methyl-2-phenyl)ethyl-glycine (200g), thionyl chloride (139g) and benzene (2 liters) were refluxed together for four hours and permitted to stand at room temperature for about 16 hours (over night). Evaporation of the solvents afforded a solid acid chloride, having a melting point of 97°–101°C. IR showed a strong carbonyl absorption at 1800 cm-1 (CO Cl).

d-4-Methyl-3-toluene-p-sulfonyl-1,2,4,5-tetrahydro-3H,3-benzazepin-1-one d-N-Toluene-p-sulfonyl-N(1-methyl-2-phenyl)-ethyl glycine acid chloride (0.575M) was dissolved in methylene chloride (500ml) and added dropwise to a suspension of aluminum chloride (306g) and methylene chloride (2 liters) at 70°C during 1.5 hours. The reaction was stirred for 24 hours as it warmed to +10° C. The suspension was poured into ice (4kg) water (4 liters), concentrated HCl (700ml) and stirred for 1.5 hours. The methylene chloride layer was separated and the aqueous layer was washed twice with methylene chloride (500ml each). The methylene chloride layers were combined and washed with water, dilute NaOH solution, water and brine. The reaction product was dried over MgSO$_4$, the solvents evaporated and the solid recrystallized from 95 percent ethanol several times.

d-1-Hydroxy-4-methyl-3-toluene-p-sulfonyl-1,2,4,4-tetrahydro-3H,3-benzazepine d-4-Methyl-3-toluene-p-sulfonyl-1,2,4,5-tetrahydro-3H,3-benzazepin-1-one (155g) was suspended in 95 percent ethanol (2 liters) and sodium borohydride (19g) was added. The reaction was warmed to 70° C during 30 minutes and then stirred while cooling for three hours. The ethanol solution and the suspended solid were poured cautiously with stirring into 6 liters of icewater/250ml concentrated HCl. The gummy alcohol was extruded into chloroform. Evaporation of the chloroform afforded a solid.

d-2-Methyl-3-toluene-p-sulfonyl-1,2-dihydro-3H,3-benzazepine d-1-Hydroxy-4-methyl-3-toluene-p-sulfonyl-1,2,4,5-tetrahydro-3H,3-benzazepine was dissolved in benzene (1 liter) containing p-toluene sulfonic acid as a catalyst (1g). After refluxing in a Dean and Stark separator during which a total additional quantity of p-toluene sulfonic acid amounting to 3g were added to the reaction, the benzene solution was washed with dilute NaOH to remove the catalyst, and the solvent was evaporated to give an oil.

d-2-Methyl-3-toluene-p-sulfonyl-1,2,4,5-tetrahydro-3H,3-benzazepine d-2-Methyl-3-toluene-p-sulfonyl-1,2-dihydro-3H,3-benzazepine (117.5g) was suspended in acetic acid (1 liter) along with 10g of 5 percent Pd/C. The mixture was hydrogenated at room temperature in a 2 liter flask on a Parr apparatus at 45 psi. After 6.5 hours the flask was flushed with nitrogen and the solution was filtered through a pad of Celite. Some crystallization had occurred and the cake was washed with chloroform. Evaporation of the chloroform afforded a solid melting at 111°–113.0° C. After standing approximately 16 hours (over night) a solid crystallized from the acetic acid. The solid was filtered, melting point 112°–114° C. The acetic acid was removed by evaporation to a volume of 200ml and the precipitated solid was filtered, melting point 112°–114° C. The filtrate was evaporated and the solid residue was washed with isopropyl ether to give a solid, melting point 111°–113.5° C.

(−)-2-Methyl-1,2,4,5-tetrahydro-3H,3-benzazepine

A sodium naphthalene solution in 1,2-dimethoxy ethane (3L) was prepared from sodium (39g) and naphthalene (236g) at 25°–35° C during 2 hours. Solid d-2-methyl-3-toluene-p-sulfonyl-1,2,4,5-tetrahydro-3H,3-benzazepine (90g) was added during 20 minutes at 22°–26° C with a cooling bath in place. The reaction was stirred for 2.5 hours at room temperature (about 20° C). The reaction mixture was decomposed by adding water (50ml) at 15°–20° C and evaporating the solvent. The residue was dissolved in ether/water and the ether layer was separated. The ether was washed with dilute HCl and the acid layer was separated. Aqueous sodium hydroxide was added and the amine isolated in ether afforded an oil. The oil was converted to the hydrochloride which was gummy. Trituration with hot acetone (200ml) afforded a brown solid which later turned blue, melting point 184°–187° C. Ether was added to the acetone and a further 8.4g was obtained, melting point 178°–182° C. The dark green filtrates were evaporated and the residue dissolved in water. Basification with aqueous NaOH and extraction with ether afforded an oil. The oil was converted to the hydrochloride in ether and the gummy salt was treated with warm acetone and the resulting solid was filtered, melting point less than 140° C. The solid was dissolved in acetone (50ml) /isopropanol (17.5ml) at reflux and cooled in a refrigerator at about 4° C. The first crop of crystals was filtered, melting point 178°–182° C. The filtrate was evaporated and the gummy residue was triturated with acetone and the solid filtered, melting point 120°–130° C. The salts so prepared were combined and made basic with NaOH and the free amine was isolated in ether. The oil was distilled to give a colorless amine which afforded a solid hydrochloride from ether. The salt was dissolved in hot isopropanol (125ml), filtered and diluted with ether (125ml). Immediate crystallization began and the suspension was stirred for 16 hours at room temperature. The salt was filtered to give a solid melting at 183°–187° C.

(+) 3-(p-Aminophenethyl)-2-methyl-1,2,4,5-tetrahydro-3H,3-benzazepine (Cpd. 786-737)

(−) 2-Methyl-1,2,4,5-tetrahydro-3H,3-benzazepine hydrochloride (10.8 g.) was converted to the free amine and the resulting oil was isolated. The oil was treated with p-nitrophenylacetic acid (10.9 g) and dicyclohexylcarbodiimide (13.7 g) in tetrahydrofuran (150 ml) at room temperature for 7 hours. Acetic acid (1 ml) was added and the insolubles were filtered. Evaporation of the tetrahydrofuran solution afforded crude 2-methyl-3-(p-nitrophenylacetyl)-1,2,4,5-tetrahydro-3H,3-benzazepine. This material was hydrogenated in methanol (350 ml) containing conc. hydrochloric acid (7 ml) over 5 percent palladium-charcoal (3 g) at 50 p.s.i. Filtration of the catalyst and evaporation of the solvents afforded a semi-solid which was dissolved in water (200 ml). Some insolubles were filtered and the filtrate was basified with dilute sodium hydroxide to give the crude amino-amide which was extracted into chloroform. Evaporation of the solvent afforded the 3-(p-aminophenylacetyl)-2-methyl-1,2,4,5-tetrahydro-3H,3-benzazepine as an oil. This oil was dissolved in tetrahydrofuran (200 ml) and added dropwise to a suspension of lithium aluminum hydride (3.8 g, 0.1 m) in tetrahydrofuran (150 ml) during 1.5 hours. The reaction was refluxed for 5 hours. Decomposition with water and dil. sodium hydroxide solution and filtration from the inorganic salts gave, on evaporation of the filtrate, an oil. The oil was converted to the dihydrochloride salt in methanol and the solid was purified (by recrystallization from methanol to give (+) 3-(p-aminophenethyl)-2-methyl-1,2,4,5-tetrahydro-3H,3-benzazepine dihydrochloride. $[\alpha]_D^{23°} = +1.41°$ (C, 0.85 in $H_2O$).).

Calcd. for $C_{19}H_{26}Cl_2N_2$: C, 64.59; H, 7.42; Cl, 20.07; N, 7.93. found: C, 64.56; H, 7.70; Cl, 20.14; N, 7.84.

EXAMPLE 9.

(−)-3-(p-Aminophenethyl)-2-methyl-1,2,4,5-tetrahydro-3H,3-benzazepine dihydrochloride (Cpd. 786-738)

Example 8 was repeated except that (−) amphetamine was substituted for (+) amphetamine to give (−)-3-(p-aminophenethyl)-2-methyl-1,2,4,5-tetrahydro-3H,3-benzazepine dihydrochlorine $[\alpha]_D^{23°} = -1.22°$ (C, 0.9 in $H_2O$).).

Calcd. for $C_{19}H_{26}Cl_2N_2 \cdot xH_2O$ C, 62.33; H, 7.50; Cl, 19.94; N, 7.65. (corrected for 2.9% water). found: C, 63.92; H, 7.56; Cl, 20.04; N, 7.96.

EXAMPLE 10.

3-(p-Aminophenethyl)-1,2,4,5-tetrahydro-3H,3-benzazepine. (Cpd. 793-715)

A solution of 1,2,4,5-tetrahydro-3H,3-benzazepine (23 gm) in T.H.F. (185 ml) was added to a solution of p-nitrophenylacetic acid (28.2 gm) and dicyclohexylcarbodiimide (35.2 gm) in T.H.F. (370 ml). After stirring for 5 hrs at room temperature, acetic acid (3.7 ml) was added and the insolubles were filtered. Evaporation of the filtrate and trituration of the residue with ether afforded a solid which was filtered to give 3-(p-nitrophenylacetyl)-1,2,4,5-tetra-hydro-3H,3-benzazepine (36 gm). This amide was dissolved in methanol (480 ml) and conc. hydrochloric acid (9.5 ml) was added. The solution was hydrogenated at 50 p.s.i. over 5 percent palladium charcoal (3.2 gm). Hydrogenation was complete in one hour. Filtration of the catalyst and evaporation of the solvent afforded the crude hydrochloride which was treated with aqueous alkali and again filtered to give 3-(p-amino-phenylacetyl)-1,2,4,5-tetrahydro-3H,3-benzazepine (24.4 gm). The amine (16.2 gm) was dissolved in tetrahydrofuran (200 ml) and added dropwise to a suspension of lithium aluminum hydride (6.6 gm) in tetrahydrofuran (200 ml) during 30 minutes. After refluxing for 17 hours, the ice-cooled reaction was decomposed by the consecutive addition of water (6.6 ml), 15 percent aq. NaOH (6.6 ml) and water (19.6 ml). The salts were filtered and the solvent evaporated to give a solid (15.3 gm). The solid was treated with hydrogen chloride in methanol solution and the precipitated solid was recrystallized from methanol to give 3-(p-aminophenethyl)-1,2,4,5-tetra-hydro-3H,3-benzazepine dihydrochloride.

Calcd. for $C_{18}H_{24}Cl_2N_2$: C, 63.72; H, 7.13; Cl, 20.90; N, 8.25. found: C, 63.38; H, 7.46; Cl, 20.91; N, 8.42.

EXAMPLE 11.

(−)-3-(p-Aminophenethyl)-8-methoxy-2-methyl-1,2,4,5-tetrahydro-3H,3-benzazepine dihydrochloride (Cpd. 786-723)

(−) 8-Methoxy-2-methyl-1,2,4,5-tetrahydro-3H,3-benzazepine

Racemic 8-methoxy-2-methyl-1,2,4,5-tetrahydro 3H,3-benzazepine (44g,.22M) was dissolved in absolute methanol (250 ml) and added to a solution of D(+)-tartaric acid (34.5 g, .23M) in methanol (400 ml). The resulting solution was filtered and allowed to stand at room temperature for three days. The methanol was filtered from the dense crystalline material. Wt = 24 g. A second crop was obtained by concentrating the filtrate to 300 ml and standing for 24 hr. Wt = 7.3 g. The combined solids were recrystallized from methanol (500 ml) and after 24 hr the solid precipitate was filtered. Wt = 21.6 g. This salt was again recrystallized from methanol (350 ml) and after 24 hr the precipitate was filtered. Wt = 16.3 g.

$$[\alpha]_{578}^{25°} = -4.8°; (c = 1.08 \text{ in } H_2O)$$

Concentration of the filtrates from the second and third crystallizations afforded more materials which were combined and recrystallized twice from methanol to give more of the required salt. Wt = 3.8 g. $[\alpha]_{578}^{25°}$ = −5.4°; (c=1.00 in H$_2$O). The combined salts were dissolved in water and basified with 10 percent sodium hydroxide solution. The amine was isolated by extraction into benzene. Evaporation of the benzene afforded the amine. Wt = 10.5 g, yield = 25%. A sample of the hydrochloride had $[\alpha]_{578}^{25°}$ = (−) 26.8°; (c = .89 in H$_2$O.

(+) 8-Methoxy-2-methyl-3-(p-nitrophenylacetyl)-1,2,4,5-tetrahydro-3H,3-benzazepine 8-Methoxy-2-methyl-1,2,4,5-tetrahydro-3H,3-benzazepine (8 g, .042M) [obtained from its D(+)-tartrate salt with $[\alpha]_{578}^{25°}$ = −4.93°; (c = 1.08 in H$_2$O)] was dissolved in tetrahydrofuran (50 ml). A solution of p-nitrophenylacetic acid (8.35 g,.0464M) in tetrahydrofuran (50 ml) and a solution of dicyclohexylcarbodiimide (10.5 g, .051M) were mixed rapidly and the solution of the benzazepine was immediately added all at once. The stirred reaction mixture was cooled by a water bath at 20°-30° for 20 hr. Acetic acid (1 ml) was added and after 30 min the insoluble dicyclohexyl urea was filtered. The filtrate was evaporated and the solid residue was triturated with diethyl ether and filtered to give the crude title compound. Wt = 12.5 g containing some dicyclohexyl urea. Yield = 83 percent. A sample was recrystallized from iso-propanol. mp = 85°–88°; $[\alpha]_{578}^{25°}$ = +154°; (c = 0.975 in methanol).

(+) 3-(p-Aminophenylacetyl)-8-methoxy-2-methyl-1,2,4,5-tetrahydro-3H,3-benzazepine (+) 8-Methoxy-2-methyl-3-(p-nitrophenylacetyl)-1,2,4,5-tetrahydro-3H,3-benzazepine (12.5 g, 0.035M) containing traces of dicyclohexyl urea was dissolved in methanol: conc. HCl (150 ml:3 Ml) and reduced over 5 percent palladium charcoal (1 g) at 50 psi. The reduction was complete in 30 min and the charcoal was filtered. The solvent was evaporated from the filtrate and the residue was redissolved in warm water, filtered from the insolubles and basified with excess dilute sodium hydroxide solution. The precipitated amine was isolated by extraction into chloroform. Evaporation of the chloroform and trituration of the residue with isopropyl ether gave a solid which was filtered to give the title compound. Wt = 9.6 g, yield = 85 percent, mp = 121-124°.

$$[\alpha]_{578}^{25°} = +108°$$

(c = 0.987 in methanol).

(−) 3-(p-Aminophenethyl)-8-methoxy-2-methyl-1,2,4,5-tetrahydro-3H,3-benzazepine dihydrochloride (+) -3-(p-Aminophenylacetyl)-8-methoxy-2-methyl-1,2,4,5-tetrahydro-3H,3-benzazepine (9.6 g 0.029M) was dissolved in tetrahydrofuran (100 ml) and added dropwise to a suspension of lithium aluminum hydride (2.2 g, .06M) in tetrahydrofuran (100 ml) during 30 min at gentle reflux in a nitrogen atmosphere. The reaction was stirred and refluxed for 17 hr. The ice-cooled reaction was was decomposed by the consecutive addition of water (2.2 ml), 15 percent sodium hydroxide (2.2 ml) and water (6.6 ml). After stirring for 30 min the salts were filtered and the filtrate was dried over magnesium sulfate. Evaporation of the dried solvents afforded an orange gum (Wt = 8.8 g) which was crystallized from iso-propanol (25ml) to give the amine. Wt= 4.9g. The filtrate was evaporated to dryness and the residue (3.9 g) which contained some product and starting material was retreated with lithium aluminum hydride (1 g) in the same manner to give a gum (3.7 g) free of starting material. The combined products were dissolved in methanol (100 ml) and hydrogen chloride was passed into the solution until excess had been added. The methanol solution was diluted with tetrahydrofuran (150 ml) and the mixture was evaporated on the rotatory evaporator to a thick slurry. The solid was filtered and washed with tetrahydrofuran. Wt = 8.5 g. This solid was dissolved in hot methanol (35 ml) and charcoaled. The filtrate from the charcoal treatment (40 ml) was heated to reflux and then diluted with tetrahydrofuran (50 ml). The mixture was stirred while cooling for 2 hr. The precipitate was filtered and dried at 100°/6 hr. Wt = 6.0 g, yield = 53%

$$[\alpha]_{578}^{25°} = -10.4°; (c = 0.99 \text{ in } H_2O).$$

EXAMPLE 12.

(+)-3-(p-Aminophenethyl)-8-methoxy-2-methyl-1,2,4,5-tetrahydro-3H,3-benzazepine dihydrochloride (Cpd. 786-722)

The title compound was prepared by repeating Example 11, except that D(−)-tartaric acid was used in place of the D(+) tartaric acid of Example 11. $[\alpha]_{578}^{25°}$ = +10.9 (C, 1.015 in H$_2$O).

EXAMPLE 13.

(−)-3-p-Acetamidophenethyl)-8-methoxy-2-methyl-1,2,4,5-tetrahydro-3H,3-benzazepine. (Cpd. 793-765)

(−)-3-(p-Aminophenethyl)-8-methoxy-2-methyl-1,2,4,5-tetrahydro-3H,3-benzazepine dihydrochloride (15 gm) was suspended in chloroform and triethylamine (12.5 gm) was added. Acetyl chloride (3.76 gm) was added to the ice-cooled reaction during 5 minutes and stirred for one hour. The chloroform suspension was washed with water and dried. Evaporation of the chloroform afford a solid (12 gm) which was dissolved in methanol and treated with hydrogen chloride. The precipated salt was filtered to give (−)-3-(p-acetamidophenethyl)-8-methoxy-2-methyl-1,2,4,5-tetrahydro-3H,3-benzazepine hydrochloride. $[\alpha]_D^{23°}$ = −6.98°(C, 1.03 in H$_2$O).

Calcd. for $C_{22}H_{29}ClN_2O_2$: C, 67.94; H, 7.52; Cl, 9.12; N, 7.20. found: C, 67.99; H, 7.41; Cl, 9.31; N, 7.13.

TABLE IV

| Compound | I.P.[1] Symptomatology HTD[2] mg/kg | LD$_{50}$[3] mg/kg | PBQ[4] Analgesia P.O.[5] mg/kg | S.C.[6] mg/kg | MTS[7] S.C. |
|---|---|---|---|---|---|
| 751-226 | 10 | 200 | >100 | 3 | 17 |
| 786-737 | 10 | 60 | 10 | 3 | 10 |
| 786-738 | 3 | 60 | 20 | 6 | 30 |
| 793-715 | 3 | 60 | 30 | 10 | — |
| 793-765 | 3 | ~200 | ~30 | 7 | <10* |
| 778-033 | ~10 | 59 | 23.8 | 2.00 | 6.7 |
| 786-722 | 3-10 | 38 | >30 | 2.05 | 1.4 |
| 786-723 | 3-10 | 92 | 21.2 | 1.34 | 1.57 |

*I.P.
1. IP = intraperitoneal route
2. HTD = highest tolerated dose
3. LD$_{50}$ = median lethal dose
4. PBQ = phenylbenzoquinone writhing
5. PO = oral route
6. SC = subcutaneous route
7. MTS = mouse tail stimulation

I claim:
1. A compound of the formula:

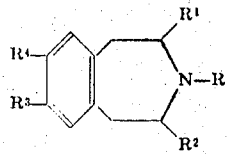

or acid addition salts thereof wherein R is aminophenyl-lower alkyl, lower alkanoylamidophenyl-lower alkyl, methyl-aminophenyl-lower alkyl, ethylaminophenyl-lower alkyl, or dimethylaminophenyl-lower alkyl in each of which said amido or amino group is either ortho, meta, or para to said lower alkyl group; $R^1$ and $R^2$ are independently H or lower alkyl; $R^3$ and $R^4$ are independently H or OH or lower alkoxy.

2. The compound of claim 1 wherein R is p-aminophenethyl; $R^1$ is methyl and each of $R^2$, $R^3$ and $R^4$ is hydrogen.

3. The compound of claim 2 which is (+)-3-(p-aminophenyl)-2-methyl-1,2,4,5-tetrahydro-3H,3-benzazepine dihydrochloride.

4. The compound of claim 2 which is (−)-3-(p-aminophenyl)-2-methyl-1,2,4,5-tetrahydro-3H,3-benzazepine dihydrochloride.

5. The compound of claim 1 wherein R is p-aminophenethyl; $R^1$ is methyl; $R^3$ is 7-hydroxy, and each of $R^2$ and $R^4$ is hydrogen.

6. The compound of claim 1 wherein R is p-aminophenethyl; $R^1$ is methyl; $R^4$ is 8-hydroxy, and each of $R^2$ and $R^3$ is hydrogen.

7. The compound of claim 1 wherein R is p-aminophenethyl; $R^1$ is methyl; $R^3$ is 7-methoxy, and each of $R^2$ and $R^4$ is hydrogen.

8. The compound of claim 1 wherein R is p-aminophenethyl; $R^1$ is methyl; $R^4$ is 8-methoxy, and each of $R^2$ and $R^3$ is hydrogen.

9. The compound of claim 8 which is (−)-3-(p-aminophenethyl)-8-methoxy-2-methyl-1,2,4,5-tetrahydro-3H,3-benzazepine.

10. The compound of claim 8 which is (+)-3-(p-aminophenethyl)-8-methoxy-2-methyl-1,2,4,5-tetrahydro-3H,3-benzazepine.

11. The compound of claim 1 wherein R is p-aminophenethyl; each of $R^1$, $R^2$ and $R^4$ is hydrogen, and $R^3$ is 7-methoxy.

12. The compound of claim 11 which is 3-(para-amino phenyl-ethyl)-7-methoxy-1,2,4,5-tetrahydro-3 H,3-benzazepine dihydrochloride.

13. The compound of claim 1 wherein R is p-aminophenethyl; each of $R^1$, $R^2$ and $R^4$ is hydrogen, and $R^3$ is 7-hydroxy.

14. The compound of claim 1 which is 3-(2-p-aminophenyl-1-methyl-ethyl)-7-methoxy-1,2,4,5-tetrahydro-3H,3-benzazepine dihydrochloride.

15. The compound of claim 1 wherein R is p-aminophenethyl and each of $R^1$, $R^2$, $R^3$ and $R^4$ is hydrogen.

16. The compound of claim 1 which is 3-(p-acetamidophenethyl)-1-,2,4,5-tetrahydro-3H,3-benzazepine.

17. The compound of claim 1 wherein R is p-acetamidophenethyl; each of $R^1$, $R^2$ and $R^4$ is hydrogen, and $R^3$ is 7-hydroxy.

18. The compound of claim 1 wherein R is p-acetamidophenethyl; each of $R^1$, $R^2$ and $R^4$ is hydrogen, and $R^3$ is 7-methoxy.

19. The compound of claim 18 which is 7-methoxy-3-(p-acetamidophenethyl)-1,2,4,5-tetrahydro-3H,3-benzazepine hydrochloride.

20. The compound of claim 1 wherein R is p-acetamidophenethyl; $R^1$ is methyl; each of $R^2$ and $R^3$ is hydrogen, and $R^4$ is 8-methoxy.

21. The compound of claim 20 which is (−)-3-(p-acetamidophenethyl)-8-methoxy-2-methyl-1,2,4,5-tetrahydro-3H,3-benzazepine hydrochloride.

* * * * *